United States Patent
Toh (10) Patent No.: US 9,359,997 B2
(45) Date of Patent: Jun. 7, 2016

(54) METHOD AND SYSTEM FOR PRODUCING ELECTRICITY FROM AIRPORT ACOUSTICAL ENERGY

(71) Applicant: The Boeing Company, Chicago, IL (US)

(72) Inventor: Chin H. Toh, Orange, CA (US)

(73) Assignee: The Boeing Company, Chicago, IL (US)

( * ) Notice: Subject to any disclaimer, the term of this patent is extended or adjusted under 35 U.S.C. 154(b) by 120 days.

(21) Appl. No.: 14/211,128

(22) Filed: Mar. 14, 2014

(65) Prior Publication Data

US 2015/0260171 A1 Sep. 17, 2015

(51) Int. Cl.
| | |
|---|---|
| F03G 7/00 | (2006.01) |
| F03G 7/08 | (2006.01) |
| H02K 7/18 | (2006.01) |
| F03D 9/00 | (2016.01) |

(52) U.S. Cl.
CPC .. *F03G 7/08* (2013.01); *F03D 9/00* (2013.01); *H02K 7/1823* (2013.01); *F05B 2240/9113* (2013.01); *Y02E 10/728* (2013.01)

(58) Field of Classification Search
CPC .......................................................... F03G 7/00
USPC .............................................................. 290/55
See application file for complete search history.

(56) References Cited

U.S. PATENT DOCUMENTS

| | | | | |
|---|---|---|---|---|
| 2,509,913 | A | * | 5/1950 | Espenschied ................. 290/4 D |
| 2,522,389 | A | * | 9/1950 | Mason ..................... 310/323.01 |
| 2,531,230 | A | * | 11/1950 | Mason .......................... 290/1 R |
| 2,539,535 | A | * | 1/1951 | Espenschied ................. 290/1 R |
| 3,772,541 | A | * | 11/1973 | Campagnuolo et al. ...... 470/141 |
| 4,441,316 | A | * | 4/1984 | Moody ........................... 60/398 |
| 4,594,853 | A | * | 6/1986 | Raichlen et al. ................ 60/502 |

(Continued)

FOREIGN PATENT DOCUMENTS

| | | | |
|---|---|---|---|
| CN | 101539125 A | * | 9/2009 |
| CN | 203051012 U | | 7/2013 |
| CN | 103352816 A | | 10/2013 |
| WO | 2006113777 A2 | | 10/2006 |

OTHER PUBLICATIONS

PCT International Search Report and PCT Written Opinion of the International Searching Authority—Jun. 3, 2015, for PCT Application No. PCT/US2015/019166.

(Continued)

*Primary Examiner* — Joseph Waks
(74) *Attorney, Agent, or Firm* — John S. Economou (57) ABSTRACT

A system and method for generating electricity from acoustic energy from an aircraft on a runway. Acoustic wave collectors mounted along the runway collect the acoustic energy and direct such acoustic energy to an associated acoustic converter assembly. A vibrating element is mounted within a housing of the acoustic converter assembly. The vibrating element moves in response to the acoustic energy. This movement draws air into the housing below the vibrating element and then forces the air downward to form an output air flow. The output air flow is directed to an associated turbine assembly to cause a shaft to rotate at a rate proportional to the magnitude of the received output air flow. An associated generator that is coupled to the shaft generates electricity proportionally to the rate of rotation of the shaft. The electricity from each generator is converted and sent to a substation for distribution.

18 Claims, 5 Drawing Sheets

(56) References Cited

U.S. PATENT DOCUMENTS

| | | | | |
|---|---|---|---|---|
| 5,186,822 | A | * | 2/1993 | Tzong et al. ............... 210/122 |
| 5,231,337 | A | * | 7/1993 | van Namen ............... 318/128 |
| 5,998,882 | A | * | 12/1999 | Alston ............... 290/54 |
| 6,259,165 | B1 | * | 7/2001 | Brewington ............... 290/1 A |
| 8,129,853 | B2 | | 3/2012 | Abolhassani et al. |
| 2006/0011411 | A1 | * | 1/2006 | Kawahashi et al. ............... 181/262 |
| 2006/0082158 | A1 | | 4/2006 | Schrader |
| 2009/0250936 | A1 | * | 10/2009 | Souryal ............... 290/55 |
| 2011/0233941 | A1 | | 9/2011 | Jee |

OTHER PUBLICATIONS

Wikipedia: "Sound Pressure", printed Mar. 12, 2014, retrieved from: http://en.wikipedia.org/wiki/Sound_pressure—7 pages.

Wikipedia: "Speed of Sound", printed Mar. 12, 2014, retrieved from: http://en.wikipedia.org/wiki/Speed_of_sound—17 pages.

"The Speed of Sound", printed Mar. 12, 2014, retrieved from: http://www2.cose.isu.edu/~hackmart/soundwaveslengphys.pdf.

\* cited by examiner

METHOD AND SYSTEM FOR PRODUCING ELECTRICITY FROM AIRPORT ACOUSTICAL ENERGY

FIELD

This disclosure relates to a method and system for producing electricity from acoustical energy at an airport.

BACKGROUND

It is well recognized that airports are generate a great deal of noise during aircraft takeoffs and landings. This acoustic energy is left to dissipate and represents a lost energy resource. Heretofore, there has been no way to recycle the acoustic energy generated by aircraft during takeoffs and landings.

Accordingly, there is a need for a method and system to harvest the free acoustic energies available at airport runways for electricity generation.

SUMMARY

In one aspect, a system for generating electricity from acoustic energy. The system includes an acoustic wave collector configured to collect acoustic energy and to direct such acoustic energy in a predetermined direction. The system also includes an acoustic converter assembly positioned to receive the acoustic energy from the acoustic wave collector and configured to convert the received acoustic energy into an output air flow. The output air flow has a magnitude proportional to a magnitude of the received acoustic energy. The system further includes a turbine assembly positioned to receive the output air flow from the acoustic converter assembly so that a shaft rotates at a rate proportional to the magnitude of the received output air flow. The system finally includes a generator coupled to the shaft which generates electricity proportionally to the rate of rotation of the shaft. The turbine assembly may be a turbine blade coupled to the shaft.

In one further embodiment, the acoustic converter assembly comprises a vibrating element mounted within an associated housing. The vibrating element is positioned within the associated housing to move along a first axis. The first axis is parallel to the predetermined direction. The vibrating element is moved back and forth along the first axis proportionally to the received acoustic energy. The movement of the vibrating element draws air into the associated housing below the vibrating element via apertures in a vertical wall of the associated housing and then forces the air downward to form the output air flow. The vibrating element may be a vibrating drum and the vertical wall of the associated housing may form a cylinder. The acoustic converter assembly may further include an acoustic waveguide mounted above the vibrating element. The acoustic waveguide has a wider inlet adjacent to the acoustic wave collector and a narrower outlet adjacent to the vibrating element. The acoustic waveguide may have a conical form.

In another further embodiment, the acoustic converter assembly includes a plurality of converters. Each converter includes a vibrating element mounted within an associated housing. The vibrating element is positioned within the associated housing to move along a first axis. The first axis is parallel to the predetermined direction. The vibrating element is moved back and forth along the first axis proportionally to the received acoustic energy. The movement of the vibrating element draws air into the associated housing below the vibrating element via apertures in a wall of the associated housing and forces the air downward to form a portion of the output air flow. Each of the vibrating elements may be a vibrating drum. Each of the vertical walls of the associated housings may form a cylinder. Each converter may further include an acoustic waveguide mounted above the associated vibrating element. The acoustic waveguide has a wider inlet adjacent to the acoustic wave collector and a narrower outlet adjacent to the associated vibrating element. Each acoustic waveguide may have a conical form.

In another aspect, a system for generating electricity from acoustic energy. The system includes a plurality of acoustic wave collectors configured to collect acoustic energy and to direct such acoustic energy in a predetermined direction. The system also includes an acoustic converter assembly positioned to receive the acoustic energy from the plurality of acoustic wave collectors and configured to convert the received acoustic energy into an output air flow. The output air flow has a magnitude proportional to a magnitude of the received acoustic energy. The system further includes a turbine assembly positioned to receive the output air flow from the acoustic converter assembly so that a shaft rotates at a rate proportional to the magnitude of the received output air flow. The system finally includes a generator coupled to the shaft which generates electricity proportionally to the rate of rotation of the shaft. The turbine assembly may be a turbine blade coupled to the shaft.

In a further embodiment, the acoustic converter assembly includes a plurality of converters. Each converter is positioned adjacent to an associated one of the plurality of acoustic wave collectors. Each converter has a vibrating element mounted within an associated housing. The vibrating element is positioned within the associated housing to move along a first axis. The first axis is parallel to the predetermined direction. The vibrating element is moved upward and downward proportionally to the received acoustic energy. The movement of the vibrating element draws air into the associated housing below the vibrating element via apertures in a wall of the associated housing and forces the air downward to form a portion of the output air flow. Each of the vibrating elements may be a vibrating drum. Each of the vertical walls of the associated housings may form a cylinder. Each converter may further include an acoustic waveguide mounted above the associated vibrating element. The acoustic waveguide has a wider inlet adjacent to the acoustic wave collector and a narrower outlet adjacent to the associated vibrating element. Each acoustic waveguide may have a conical form.

In yet another aspect, a method for generating electricity from acoustic energy. First, acoustic energy is collected in an acoustic wave collector and such acoustic energy is directed in a predetermined direction. The acoustic energy is received from the acoustic wave collector and converted into an output air flow, the output air flow having a magnitude proportional to a magnitude of the received acoustic energy. The output air flow is received from the acoustic converter and, via a turbine assembly, causes a shaft to rotate at a rate proportional to the magnitude of the received output air flow. Finally, a generator generates electricity proportionally to the rate of rotation of the shaft. The received acoustic energy may be converted to an output air flow by a vibrating element mounted within an associated housing. The vibrating element is positioned within the associated housing to move along a first axis. The first axis is parallel to the predetermined direction. The vibrating element is moved back and forth along the first axis proportionally to the received acoustic energy. The movement of the vibrating element draws air into the associated housing below the vibrating element via apertures in a vertical wall of the associated housing and then forces the air downward to form the output air flow. The vibrating element may be a vibrating drum. The vertical wall of the associated housing may form a cylinder. The acoustic converter assembly may further include an acoustic waveguide mounted above the vibrating element. The acoustic waveguide has a wider inlet adjacent to the acoustic wave collector and a narrower outlet adjacent to the vibrating element.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1:
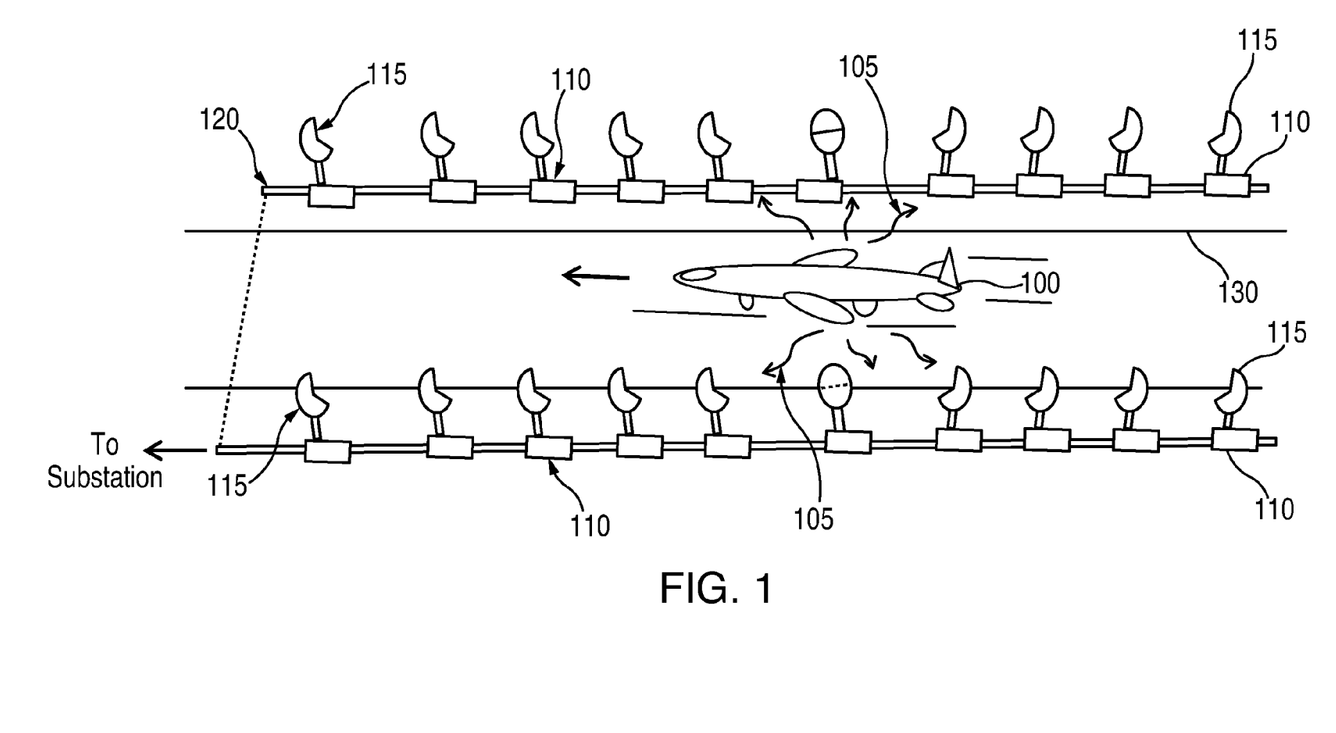
FIG. 1 is an illustration of an acoustical-to-electricity energy conversion system in accordance with an advantageous embodiment.
Figure 3:
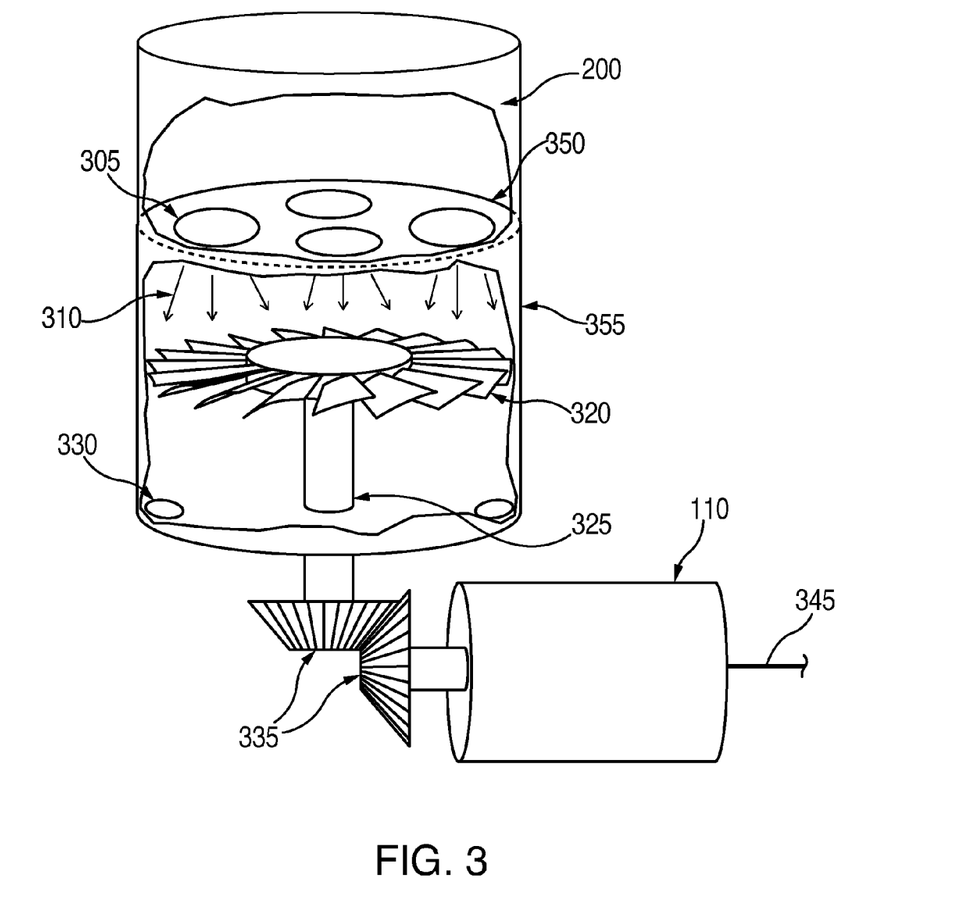
FIG. 3 is an illustration of a lower portion of the acoustical-to-electricity energy converter assembly in accordance with an advantageous embodiment.
Figure 4:
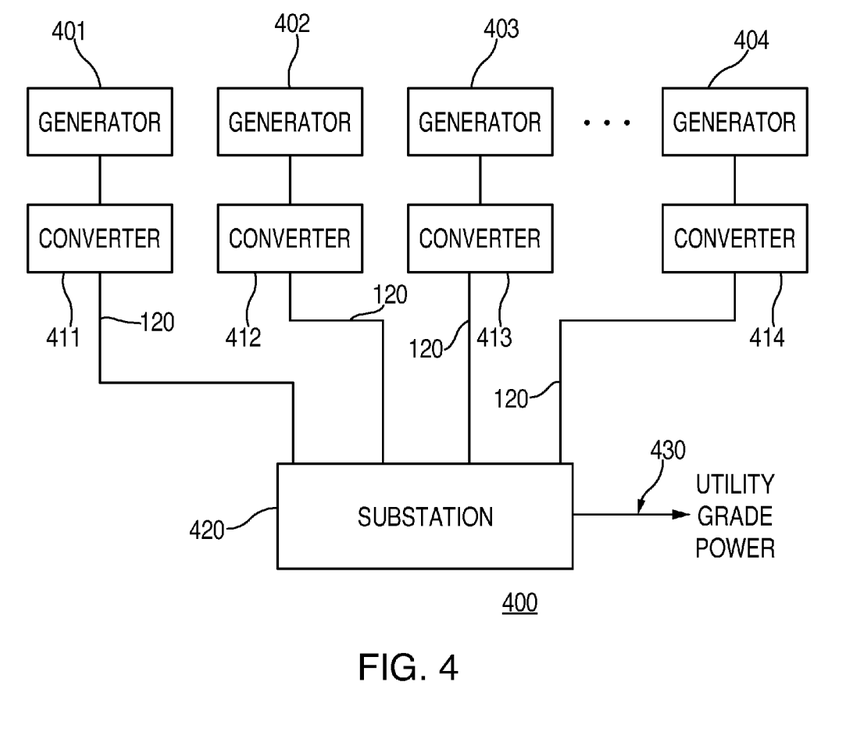
FIG. 4 is a block diagram showing the electrical connection of the acoustical-to-electricity energy conversion system in accordance with an advantageous embodiment.

Referring now to the drawings, and in particular to FIG. 1, a system for converting acoustical energy into electricity is shown. In particular, an aircraft 100 moving along a runway 130, either during landing or takeoff, generates a great deal of acoustic energy, mostly from the engines mounted on aircraft 100. The acoustic energy is shown schematically in FIG. 1 as lines 105. The system includes series of converter assemblies 115 coupled to generators 110. The converters assemblies 115 are mounted along the sides of runway 130 with an associated generator 110 located adjacent to each converter assembly 115. As aircraft 100 moves along runway 130, each converter assembly 115 captures the acoustic wave energy 105 generated by the aircraft 100 as the aircraft 100 passes and converts it to an air current, as discussed below in more detail with respect to FIGS. 2A and 2B. The generated air current drives a turbine blade coupled to an electrical generator, as shown in FIG. 3, to generate electricity. The output of the electrical generator is routed through a converter and then merged into underground power transmission lines 120 for distribution to the users, as shown in FIG. 4.

Figure 2A:
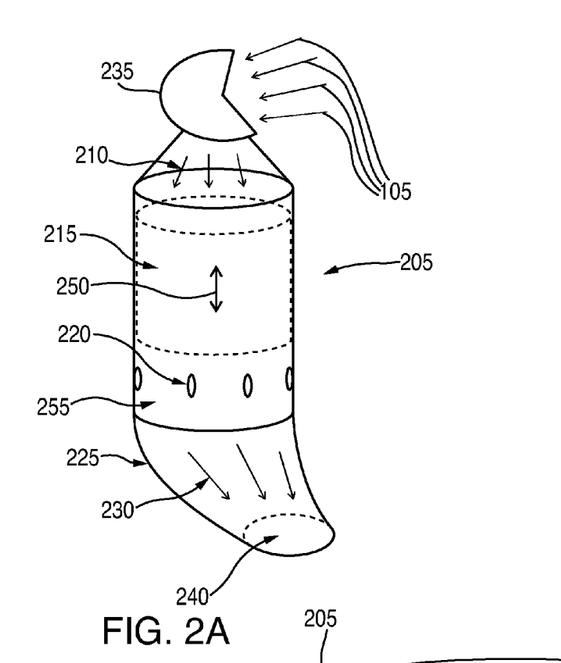
FIGS. 2A and 2B are partial and full illustrations of an upper portion of the acoustical-to-electricity energy converter assembly in accordance with an advantageous embodiment.
Figure 2B:
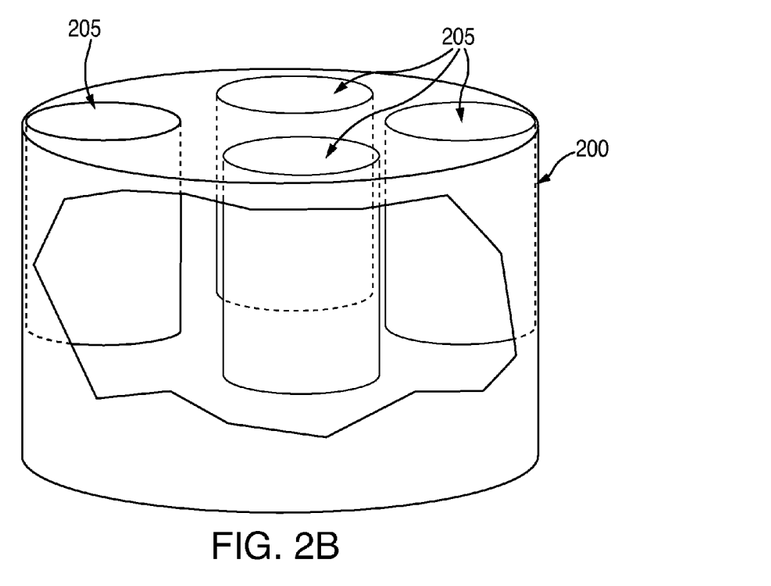

Referring now to FIGS. 2A and 2B, each converter assembly 200 (FIG. 2B) includes at least one acoustic wave collector 235 (FIG. 2A) shaped and sized for optimum collection of the incoming acoustic waves 105 from a passing aircraft and coupled to a converter 205. The shape and size of the acoustic wave collector 235 may be the same for each converter assembly 200 or may be different depending on the location of converter assembly 200 along the runway 130 (FIG. 1). Acoustic wave collector 235 has a curved internal surface and is positioned to collect the maximum possible acoustic radiations from the aircraft engines. As such, each of the converter assemblies 115 shown in FIG. 1 has a slightly different orientation with respect to the runway 130. As one of ordinary skill in the art will readily recognize, in other embodiments each converter assembly 115 may have the same orientation with respect to runway 130. FIG. 2A shows the detail of a single converter 205 and single acoustic wave collector 235, while FIG. 2B shows how four such converters 205 can be mounted within a larger assembly 200 (with the collector or collectors 235 not shown). Converter assembly 115 shown in FIG. 1 corresponds to the entire assembly (i.e., either a single converter 205 and associated acoustic wave collector 235 or an assembly 200 of multiple converters 205 and, as discussed below, one or more associate acoustic wave collectors 235).

Referring now to FIG. 2A, acoustic wave collector 235 preferably has a curved internal surface that collects and guides the acoustic waves 105 from aircraft 100 to a converter 205 that includes a vibrating drum 215 mounted in a converter drum housing 255. Vibrating drum 215 moves up and down, as shown by displacement line 250, when acoustic waves are received via acoustic wave collector 235. As one of ordinary skill in the art will readily recognize, converter drum housing 255 may be positioned in any orientation, e.g., horizontally instead of vertically, in which case the vibrating drum 215 will move back and forth along a central axis of drum housing 255. Furthermore, although vibrating drum 215 and drum housing 255 are shown having a cylindrical cross-section in FIG. 2B, one of ordinary skill in the art will readily recognize that other types of cross-sections may be employed, e.g., square, rectangular or oval. In FIG. 2B, four adjacent converters 205 are shown, each consisting of a vibrating drum 215 mounted in a converter drum housing 255 (as detailed in FIG. 2A) to form converter assembly 200 (for clarity, the one or multiple acoustic wave collectors 235 are not shown in FIG. 2B). As one of ordinary skill in the art will readily recognize, the number of converters included is arbitrary and can range from a single converter to four or more, depending, at least in part, on the amount of acoustic energy collected at collector 235. Further, converter assembly 200 may include a single acoustic wave collector 235 for all four converters 205 or a separate acoustic wave collector 235 for each of the converters 205. The collected acoustic waves 105 pass through a converging path created by the acoustic wave collector 235 and enter a chamber within converter drum housing 255 above vibrating drum 215 as the directed acoustic waves 210.

Vibrating drum 215 vibrates within a fixed range of motion at the same frequency as the incoming directed acoustic waves 210, with the magnitude of vibration proportional to the intensity of the incoming directed acoustic waves 210. When excited by the incoming directed acoustic waves 210, vibrating drum 215 moves up and down (in the orientation shown in FIG. 2A) within the cylindrical chamber of converter drum housing 255 (along displacement line 250). As it vibrates, vibrating drum 215 acts as an air pump to draw in ambient air through the air intake holes 220 in the wall of housing 255 and then push the drawn-in ambient air down though air flow guide channel 225. The vibrating drum 215, when excited by received acoustic waves, cause an air flow 230 that is pushed down along guide channel 225 and through exit hole 240.

As discussed above, converter assembly 200 preferably includes a cluster of multiple acoustic converters 205 (four are shown in FIG. 2B) to maximize the collection of acoustic energy. Each converter 205 generates an air flow through an associated exit hole 240 that is directed to a turbine chamber 355 (FIG. 3) positioned below converter assembly 200. As one of ordinary skill in the art will readily recognize, the positional relationship between converter assembly 200 and turbine chamber 355 is arbitrary and is preferably selected to minimize any air flow losses between converter assembly 200 and turbine chamber 355.

Referring now to FIG. 3, turbine chamber 355 is preferably positioned below converter assembly 200 and includes air inlet holes 305 that mate to the air exit holes 240 of converter assembly 200. Air generated from the converters 205 in converter assembly 200 enters turbine chamber 355 as airflow 310 and drives turbine blades 320, causing the shaft 325 coupled to turbine blades 320 to rotate proportionally to the magnitude of the received airflow. Turbine shaft 325 is coupled to a generator 110 via a pair of bevel gears 335. As one of ordinary skill in the art will readily recognize, other types of couplings can be used to couple turbine shaft 325 to the generator 110 (e.g., a universal joint), depending on, at least in part, the selected orientation of generator 110 with respect to turbine shaft 325. As the turbine blades 320 (and shaft 325) rotates, generator 110 produces electricity on an output 345. The airflow 310, after driving the turbine blades 320, exits from the holes 330 located at the bottom of turbine chamber 355.

Referring now to FIG. 4, a block diagram is shown of a system 400 demonstrating how the generators 110 shown in FIGS. 1 and 3 are coupled to provide utility grade power. In particular, each generator 401, 402, 403 . . . 404 is coupled to an associated converter 411, 412, 413 . . . 414. Each converter 411, 412, 413 . . . 414 may, for example, convert the variable frequency input AC voltage from generator 401, 402, 403 . . . 404 to a fixed frequency output AC voltage via a rectifier, energy storage device and voltage inverter, as is known in the art. The output from each converter 411, 412, 413 . . . 414 is provided to a substation 420, which may, for example, combine the power from each converter 411, 412, 413 . . . 414 via a three phase line filter and associated transformer to produce utility grade power on an output 430. Output 430 may be coupled, on one embodiment, to local utility lines at the airport for internal use or via an appropriate interface to commercial utility lines for credit from the local power company. As one of ordinary skill in the art will readily recognize, there are numerous alternative methods available to convert the electrical output from each generator 401, 402, 403 . . . 404 into utility grade power. As one of ordinary skill in the art will readily recognize, the system disclosed herein may be used for other purposes. For example, the electricity generated by each generator 401, 402, 403 . . . 404 may be coupled to charge batteries that are part of airport back-up systems.

Figure 5:
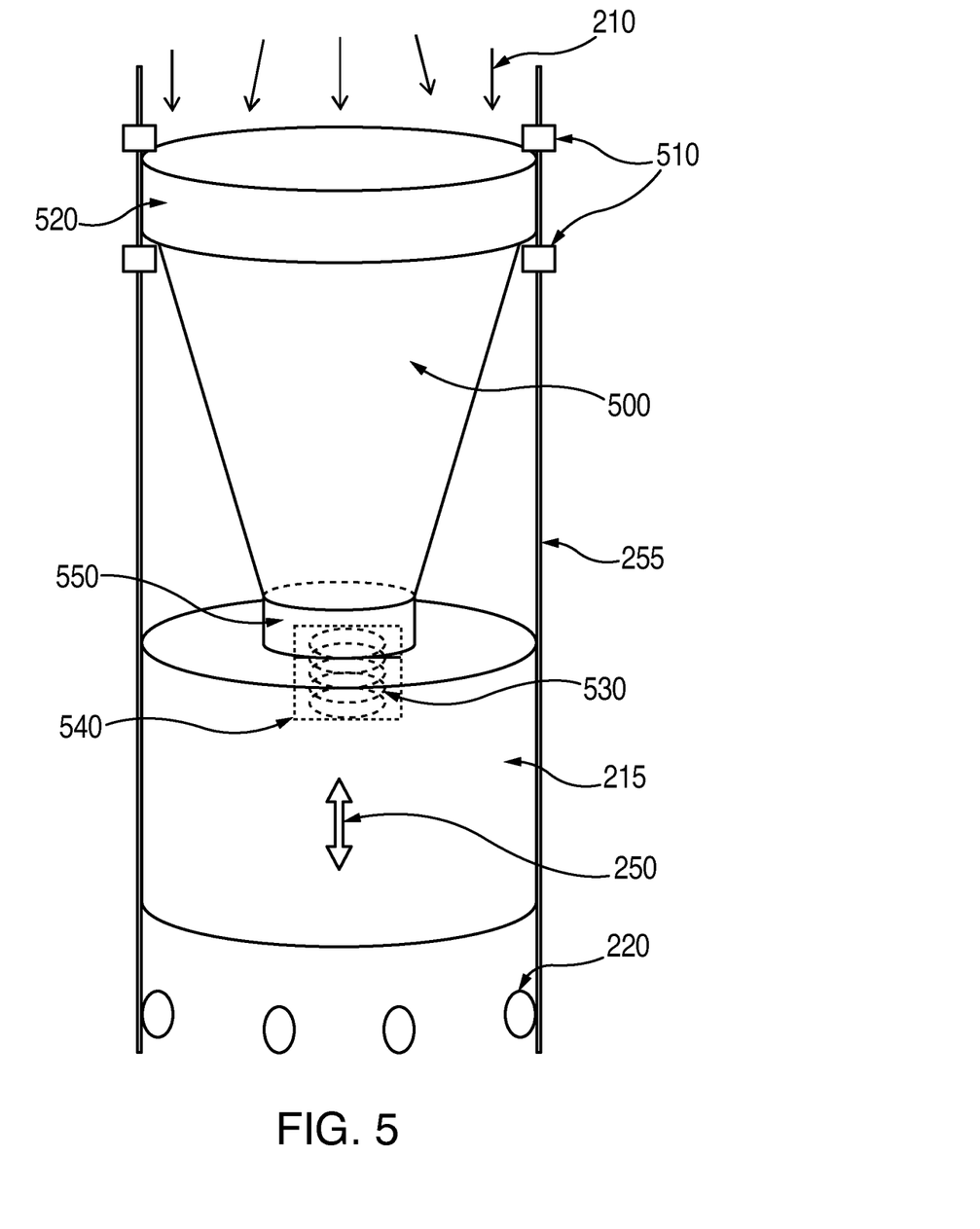
FIG. 5 is an illustration of an acoustical waveguide for use with the acoustical-to-electricity energy converter assembly in accordance with a further advantageous embodiment.

Referring now to FIG. 5, in a further embodiment converter assembly 200 may include an acoustic waveguide 500 mounted within converter drum housing 255 above vibrating drum 215. Acoustic waveguide 500 is fixed within converter drum housing 255 by couplings 510 and is preferably conical in form, with a wider inlet at an upper end 520 and a narrower outlet at a lower end 550. Acoustic waveguide 500 amplifies the directed acoustic waves 210 received at the upper end 520. Acoustic waveguide 500 may also include a spring 530 having an upper end mounted at the lower end 550. A lower end of spring 530 is connected directly to vibrating drum 215, preferably within a recess 540 in a top portion of vibrating drum 215. Spring 530 further amplifies the received converted acoustic waves 210, to further increase the movement of vibrating drum 215 and thus increase the amount of air directed downward to turn the turbine blades 320. Acoustic waveguide 500 is shown with a conical form in FIG. 5. As one of ordinary skill in the art will readily recognize, other forms may be employed. The alternative form may depend, for example, on the cross-sectional form of converter drum housing 255. In one alternative embodiment, for example, acoustic wave guide 500 may have an inverted pyramid form when converter drum housing 255 has a square cross section.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A system for generating electricity from acoustic energy, comprising:
   an acoustic wave collector configured to collect acoustic energy and to direct such acoustic energy in a predetermined direction;
   an acoustic converter assembly positioned to receive the acoustic energy from the acoustic wave collector and configured to convert the received acoustic energy into an output air flow, the output air flow having a magnitude proportional to a magnitude of the received acoustic energy;
   a turbine assembly positioned to receive the output air flow from the acoustic converter assembly so that a shaft rotates at a rate proportional to the magnitude of the received output air flow;
   a generator coupled to the shaft which generates electricity proportionally to the rate of rotation of the shaft; and
   wherein the acoustic converter assembly comprises a vibrating element mounted within an associated housing, the vibrating element positioned within the associated housing to move along a first axis, the first axis parallel to the predetermined direction, the vibrating element being moved back and forth along the first axis proportionally to the received acoustic energy, the movement of the vibrating element drawing air into the associated housing below the vibrating element via apertures in a vertical wall of the associated housing and then forcing the air downward to form the output air flow.

2. The system of claim 1, wherein the vibrating element comprises a vibrating drum and wherein the vertical wall of the associated housing comprises a cylinder.

3. The system of claim 1, wherein the acoustic converter assembly further comprises an acoustic waveguide mounted above the vibrating element, the acoustic waveguide having a wider inlet adjacent to the acoustic wave collector and a narrower outlet adjacent to the vibrating element.

4. The system of claim 3, wherein the acoustic waveguide has a conical form.

5. The system of claim 1, wherein the turbine assembly comprises a turbine blade coupled to the shaft.

6. A system for generating electricity from acoustic energy, comprising:
   an acoustic wave collector configured to collect acoustic energy and to direct such acoustic energy in a predetermined direction;
   an acoustic converter assembly positioned to receive the acoustic energy from the acoustic wave collector and configured to convert the received acoustic energy into an output air flow, the output air flow having a magnitude proportional to a magnitude of the received acoustic energy;

a turbine assembly positioned to receive the output air flow from the acoustic converter assembly so that a shaft rotates at a rate proportional to the magnitude of the received output air flow;

a generator coupled to the shaft which generates electricity proportionally to the rate of rotation of the shaft; and wherein the acoustic converter assembly comprises a plurality of converters, each converter comprising a vibrating element mounted within an associated housing, the vibrating element positioned within the associated housing to move along a first axis, the first axis parallel to the predetermined direction, the vibrating element being moved back and forth along the first axis proportionally to the received acoustic energy, the movement of the vibrating element drawing air into the associated housing below the vibrating element via apertures in a wall of the associated housing and forcing the air downward to form a portion of the output air flow.

7. The system of claim 6, wherein each of the vibrating elements comprises a vibrating drum and wherein each of the vertical walls of the associated housings comprises a cylinder.

8. The system of claim 6, wherein each converter further comprises an acoustic waveguide mounted above the associated vibrating element, the acoustic waveguide having a wider inlet adjacent to the acoustic wave collector and a narrower outlet adjacent to the associated vibrating element.

9. The system of claim 8, wherein each acoustic waveguide has a conical form.

10. The system of claim 6, wherein the turbine assembly comprises a turbine blade coupled to the shaft.

11. A system for generating electricity from acoustic energy, comprising:

a plurality of acoustic wave collectors configured to collect acoustic energy and to direct such acoustic energy in a predetermined direction;

an acoustic converter assembly positioned to receive the acoustic energy from the plurality of acoustic wave collectors and configured to convert the received acoustic energy into an output air flow, the output air flow having a magnitude proportional to a magnitude of the received acoustic energy;

a turbine assembly positioned to receive the output air flow from the acoustic converter assembly so that a shaft rotates at a rate proportional to the magnitude of the received output air flow;

a generator coupled to the shaft which generates electricity proportionally to the rate of rotation of the shaft; and wherein the acoustic converter assembly comprises a plurality of converters, each converter positioned adjacent to an associated one of the plurality of acoustic wave collectors, each converter comprising a vibrating element mounted within an associated housing, the vibrating element positioned within the associated housing to move along a first axis, the first axis parallel to the predetermined direction, the vibrating element being moved upward and downward proportionally to the received acoustic energy, the movement of the vibrating element drawing air into the associated housing below the vibrating element via apertures in a wall of the associated housing and forcing the air downward to form a portion of the output air flow.

12. The system of claim 11, wherein each of the vibrating elements comprises a vibrating drum and wherein each of the vertical walls of the associated housings comprises a cylinder.

13. The system of claim 11, wherein each converter further comprises an acoustic waveguide mounted above the associated vibrating element, the acoustic waveguide having a wider inlet adjacent to the acoustic wave collector and a narrower outlet adjacent to the associated vibrating element.

14. The system of claim 13, wherein each acoustic waveguide has a conical form.

15. The system of claim 11, wherein the turbine assembly comprises a turbine blade coupled to the shaft.

16. A method for generating electricity from acoustic energy, comprising the steps of:

collecting acoustic energy in an acoustic wave collector and directing such acoustic energy in a predetermined direction;

receiving the acoustic energy from the acoustic wave collector and converting the received acoustic energy into an output air flow, the output air flow having a magnitude proportional to a magnitude of the received acoustic energy;

receiving the output air flow from the acoustic converter and, via a turbine assembly, causing a shaft to rotate at a rate proportional to the magnitude of the received output air flow;

generating, in a generator, electricity proportionally to the rate of rotation of the shaft; and wherein the received acoustic energy is converted to an output air flow by a vibrating element mounted within an associated housing, the vibrating element positioned within the associated housing to move along a first axis, the first axis parallel to the predetermined direction, the vibrating element being moved back and forth along the first axis proportionally to the received acoustic energy, the movement of the vibrating element drawing air into the associated housing below the vibrating element via apertures in a vertical wall of the associated housing and then forcing the air downward to form the output air flow.

17. The method of claim 16, wherein the vibrating element comprises a vibrating drum and wherein the vertical wall of the associated housing comprises a cylinder.

18. The method of claim 16, wherein the acoustic converter assembly further comprises an acoustic waveguide mounted above the vibrating element, the acoustic waveguide having a wider inlet adjacent to the acoustic wave collector and a narrower outlet adjacent to the vibrating element.

* * * * *